(12) United States Patent
Okada

(10) Patent No.: US 10,072,950 B2
(45) Date of Patent: Sep. 11, 2018

(54) ENCODER AND METHOD OF OUTPUTTING MEASUREMENT VALUE OF POSITION OR ANGLE

(71) Applicant: CANON KABUSHIKI KAISHA, Tokyo (JP)

(72) Inventor: Yoshiyuki Okada, Sakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 471 days.

(21) Appl. No.: 14/231,107

(22) Filed: Mar. 31, 2014

(65) Prior Publication Data

US 2014/0299754 A1   Oct. 9, 2014

(30) Foreign Application Priority Data

Apr. 3, 2013   (JP) .................................. 2013-078091

(51) Int. Cl.
*G01D 5/34* (2006.01)
*G01D 5/347* (2006.01)
(Continued)

(52) U.S. Cl.
CPC ............. *G01D 5/347* (2013.01); *G01B 11/14* (2013.01); *G01B 11/26* (2013.01); *G01D 5/24476* (2013.01)

(58) Field of Classification Search
CPC ......... G01B 11/14; G01B 11/26; G01B 11/27; G01B 11/272; G01D 5/347
(Continued)

(56) References Cited

U.S. PATENT DOCUMENTS 4,492,465 A  *  1/1985  Erdmann ............... G01B 11/26
                                             250/202
4,868,474 A  *  9/1989  Lancraft ............ G05B 19/4141
                                             318/562
(Continued)

FOREIGN PATENT DOCUMENTS

EP         2554951 A1     2/2013
JP       H05240631 A      9/1993
(Continued)

OTHER PUBLICATIONS

European Extended Search Report dated Aug. 18, 2014 issued in corresponding European Application No. 14163415.4.
(Continued)

*Primary Examiner* — Georgia Y Epps
*Assistant Examiner* — Kevin Wyatt
(74) *Attorney, Agent, or Firm* — Rossi, Kimms & McDowell LLP

(57) ABSTRACT

An encoder for outputting a measurement value of a position or angle of a scale in accordance with a command signal transmitted with a cycle, includes: a detector configured to perform detection of a signal from the scale and output a detection signal; and a processor configured to perform generation of data representing a position or angle of the scale based on the detection signal, perform correction of the data based on a change amount of the position or angle along with movement of the scale in a delay time till receiving of a subsequent command signal after the detection, and perform outputting of the corrected data. The processor is configured to perform processing including the generation and correction in accordance with receiving of the command signal, and perform a plurality of the processing in parallel.

15 Claims, 6 Drawing Sheets

(51) Int. Cl.
*G01D 5/244* (2006.01)
*G01B 11/14* (2006.01)
*G01B 11/26* (2006.01)

(58) Field of Classification Search
USPC .............................. 250/231.1, 231.13–231.18
See application file for complete search history.

(56) References Cited

U.S. PATENT DOCUMENTS

| | | | |
|---|---|---|---|
| 5,600,221 A * | 2/1997 | Tomatsuri | G05B 19/237 318/601 |
| 5,717,512 A * | 2/1998 | Chmielewski, Jr. | G02B 26/0816 348/E13.005 |
| 5,721,546 A | 2/1998 | Tsutsumishita | |
| 6,191,507 B1 * | 2/2001 | Peltier | B65G 54/02 310/12.02 |
| 6,470,291 B1 * | 10/2002 | Goker | G11B 15/54 702/105 |
| 6,639,529 B1 | 10/2003 | Jansson | |
| 9,140,580 B2 | 9/2015 | Bielski et al. | |
| 2003/0160160 A1 * | 8/2003 | Taniguchi | H03M 1/1038 250/231.13 |

FOREIGN PATENT DOCUMENTS

| | | |
|---|---|---|
| JP | 08-261794 A | 10/1996 |
| JP | 2003329485 A | 11/2003 |
| JP | 2005221429 A | 8/2005 |
| JP | 2007-071865 A | 3/2007 |
| JP | 2008032562 A | 2/2008 |
| JP | 2013029511 A | 2/2013 |

OTHER PUBLICATIONS

Office Action issued in Japanese Appln. No. 2013-078091 dated Feb. 27, 2017.

* cited by examiner

ENCODER AND METHOD OF OUTPUTTING MEASUREMENT VALUE OF POSITION OR ANGLE

BACKGROUND OF THE INVENTION

Field of the Invention

The present invention relates to an encoder which outputs a measurement value of a position or angle of a scale and a method of outputting a measurement value of a position or angle.

Description of the Related Art

Industrial apparatuses, processing machines, and measurement apparatuses use encoders for measuring a position or angle. Known examples of linear encoders which measure a position are incremental linear encoders which measure a relative position, and absolute linear encoders which measure an absolute position. Known examples of rotary encoders which measure an angle are incremental rotary encoders which measure a relative angle, and absolute rotary encoders which measure an absolute angle.

An optical encoder irradiates a scale with light from a light source and receives, by a photoelectric conversion element, transmitted light or reflected light which passes through the scale. For example, the light source and photoelectric conversion element are attached to a moving or rotating target object, and the scale is attached to the stationary side serving as the reference. In some cases, the scale is attached to a target object, and the light source and photoelectric conversion element are attached to the stationary side.

In an incremental encoder, the marks of a transmission film or reflection film are formed on the scale at equal intervals. The received light intensity of the transmitted or reflected light having passed through the marks represent a sine wave of a predetermined cycle. A signal processor counts the wave number of a detected sine wave signal and divides the phase in the cycle, improving the measurement resolution. The signal processor combines the wave number count value and phase information to output high-resolution position information.

In an absolute encoder, the marks of a transmission film or reflection film correspond to pseudorandom number codes formed on the scale. The absolute encoder detects light signals (light intensity distribution) corresponding to the pseudorandom number codes. Based on the reference table of the pseudorandom number code and the absolute position or absolute angle, a signal processor obtains an absolute position or absolute angle corresponding to the detected pseudorandom number codes. Similar to the incremental encoder, the signal processor obtains the phases of light signals corresponding to the pseudorandom number codes, outputting high-resolution absolute position information.

In general, measurement data of the position or angle by these encoders are transmitted to a host system in response to a measurement data request signal from the host system. The host system performs positioning control necessary for an industrial apparatus or processing machine based on the measurement data of these encoders, or collects measurement data of the position or angle as a measurement apparatus.

When a target object is moving, a measurement error is generated owing to the delay time between the time of a measurement data request from the host system and the time of actual measurement in the encoder. That is, a measurement error is generated by the product of the moving velocity and delay time. Japanese Patent Laid-Open Nos. 8-261794 and 2007-71865 disclose techniques for correcting a measurement error in an encoder. In the technique described in Japanese Patent Laid-Open No. 8-261794, the moving amount (change of the position) of a target object upon the delay time taken to output position data is predicted using currently obtained position data and previously obtained position data, and then the currently obtained position data is corrected. In the technique described in Japanese Patent Laid-Open No. 2007-71865, the time till a data request after sampling by A/D conversion is measured in response to an external data request, and position data before and after the data request are interpolated to output the position data.

An industrial apparatus, processing machine, or measurement apparatus requires higher-accuracy measurement of the position or angle. On the other hand, the moving velocity or rotational velocity of a target object is becoming higher. This increases a measurement error arising from the movement of the target object and a measurement delay in the encoder. More accurate correction is required for a higher moving velocity of the target object.

The encoder described in Japanese Patent Laid-Open No. 8-261794 starts measurement in response to a measurement data request signal from a host system, corrects a position error arising from the delay time, and outputs position data. When high-speed measurement is performed, that is, the cycle of a measurement request from the host system is shorter than the sum of the measurement time, signal processing time, and position data output time, the next measurement is requested before output of position data obtained by preceding measurement. Hence, the position error arising from the delay time cannot be corrected.

The encoder described in Japanese Patent Laid-Open No. 2007-71865 measures the time till a data request after sampling by A/D conversion in response to an external data request, and interpolates position data before and after the data request, outputting the position data. In this case, the sampling cycle of A/D conversion needs to be longer than the sum of the A/D conversion time and subsequent signal processing time. To interpolate position data, position data before and after a data request are necessary. When high-speed measurement is performed, that is, the cycle of a measurement request from the host system is shorter than the sum of the A/D conversion time, signal processing time, and position data output time, it is impossible to interpolate position data before and after a measurement request and output the position data. As a result, no accurate position can be output.

SUMMARY OF THE INVENTION

The present invention provides, for example, an encoder advantageous in time required for outputting of a measurement value after an output request (command signal), and in precision of the measurement value.

The present invention in its first aspect provides an encoder for outputting a measurement value of a position or angle of a scale in accordance with a command signal transmitted with a cycle, the encoder comprising: a detector configured to perform detection of a signal from the scale and output a detection signal; and a processor configured to perform generation of data representing a position or angle of the scale based on the detection signal, perform correction of the data based on a change amount of the position or angle along with movement of the scale in a delay time till receiving of a subsequent command signal after the detection, and perform outputting of the corrected data, wherein the processor is configured to perform processing including the generation and correction in accordance with receiving of the command signal, and perform a plurality of the processing in parallel.

The present invention in its second aspect provides a method of outputting a measurement value of a position or angle in accordance with a command signal transmitted with a cycle, the method comprising steps of: performing detection of a signal from the scale and outputting of a detection signal; and performing generation of data representing a position or angle of the scale based on the detection signal, correction of the data based on a change amount of the position or angle along with movement of the scale in a delay time till receiving of a subsequent command signal after the detection, and outputting of the corrected data, wherein processing including the generation and correction is performed in accordance with receiving of the command signal, and a plurality of the processing is performed in parallel.

The present invention in its third aspect provides an encoder which, in accordance with a cycle of received command signals, outputs a position or angle measurement value of a scale, the encoder comprising: a detector configured to detect a signal and output a detection signal; and a processor configured to generate, based on the detection signal, data representing a position or angle of the scale, correct the data based on an amount of change in the position or angle of the scale corresponding to a delay time measurement and, output the corrected data, wherein the processor is further configured to perform, in accordance with receiving command signals, parallel processing on a plurality of detection signals.

Further features of the present invention will become apparent from the following description with reference to the attached drawings.

DESCRIPTION OF THE EMBODIMENTS

Figure 1:
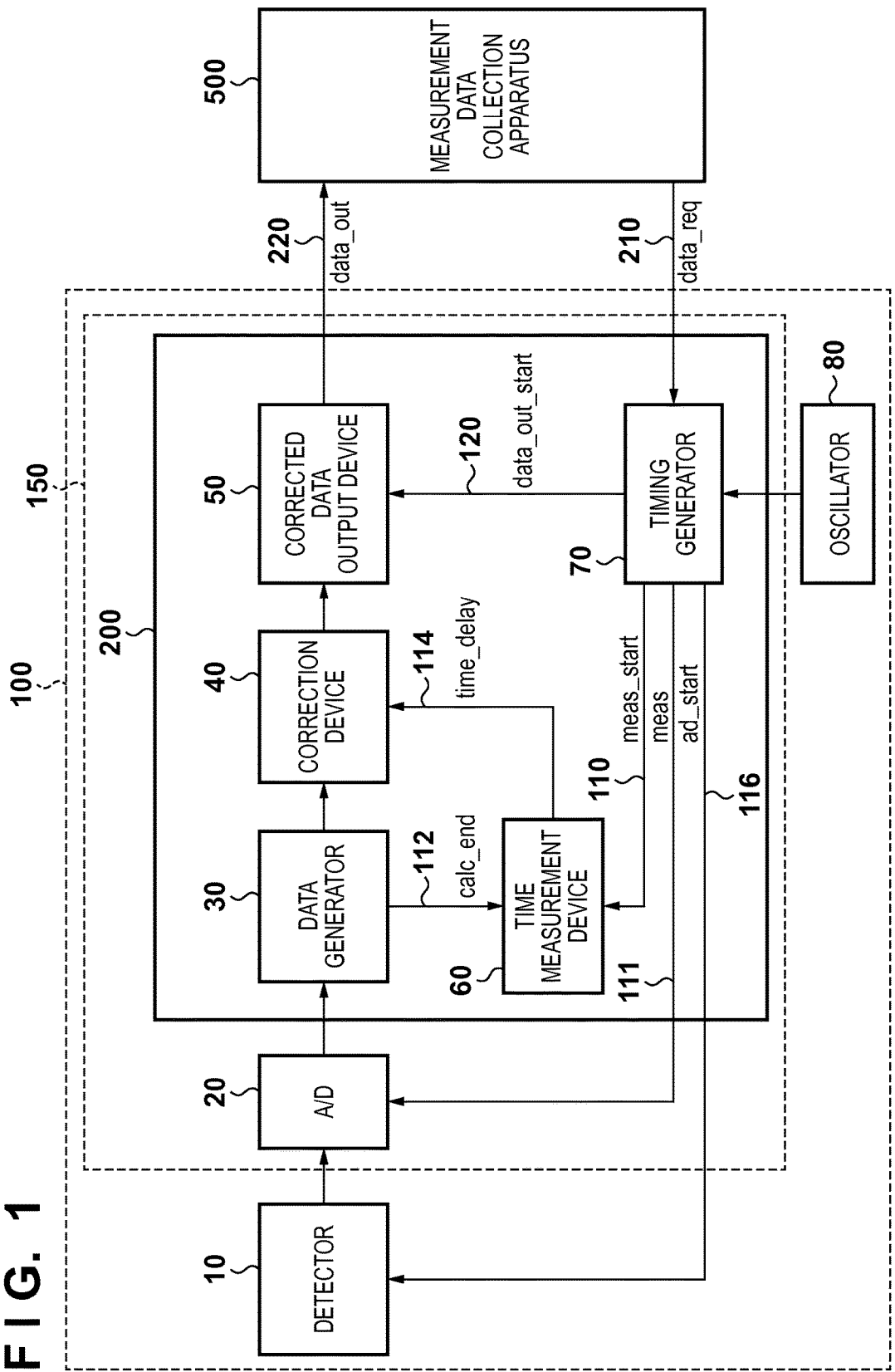
FIG. 1 is a block diagram showing the arrangement of an encoder.

A first embodiment of an encoder which measures the position of a target object will be described with reference to FIG. 1. However, the present invention is similarly applicable to even an encoder which measures the angle of a target object. FIG. 1 shows the arrangement of a signal processing system in the encoder according to a first embodiment. An encoder 100 measures the position of a target object. A measurement data collection apparatus (host system) 500 acquires data representing the position of the target object that has been measured by the encoder 100. The host system 500 is, for example, a control apparatus which performs positioning control for an industrial apparatus or processing machine or performs data collection and analysis for a measurement apparatus.

The host system 500 cyclically transmits a data_req signal (command signal) 210 to the encoder 100 and receives, as a data_out signal 220, data of a position measured at the timing of the data_req signal. In conventional devices, the cycle of the data_req signal 210 is 1 ms to 100 μs, that is, the frequency is about 1 kHz to 10 kHz, and for example, the bandwidth of positioning control is about 10 to 100 Hz.

However, the industrial apparatus, processing machine, or measurement apparatus requires higher-accuracy measurement of the position or angle. In addition, the moving velocity or rotational velocity of a target object is becoming higher. Considering this, the position or angle of a target object needs to be measured quickly at high accuracy. For example, a case in which the cycle of measurement by the data_req signal 210 is set to be 10 μs, that is, the frequency is set to be 100 kHz, and the bandwidth of positioning control is set to be about 100 Hz to 1 kHz will be examined.

Figure 2:
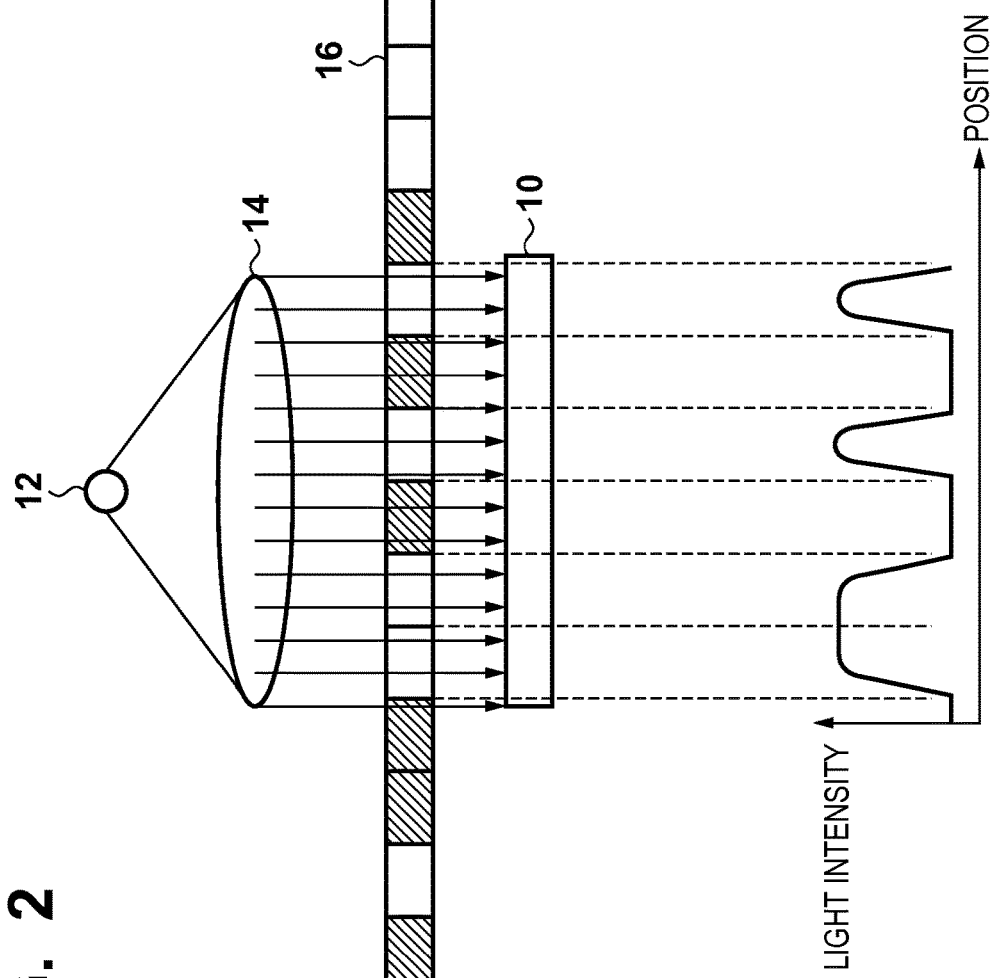
FIG. 2 is a view showing the arrangement of the detector of the encoder.

A detector 10 detects modulated light from a scale or equivalently a target object coupled thereto and outputs a detection signal. FIG. 2 shows the arrangement of the optical system of the encoder 100. A light source 12 is, for example, an LED. A collimator lens 14 collimates light which has been emitted by the LED and has entered the collimator lens 14. The collimated light exits from the collimator lens 14 toward a scale 16. In an absolute encoder, pseudorandom number codes, for example, M-sequence cyclic codes are formed on the scale 16. Light traveling from the scale 16 upon transmission or reflection has a light intensity corresponding to the pseudorandom number codes. The detector 10 receives this light. The detector 10 is, for example, a photoelectric conversion element such as a CMOS image sensor or CCD sensor. The received light intensity represents an intensity signal reflecting the pseudorandom number codes, as shown in the lower chart of FIG. 2. Note that the detector 10 and scale 16 are not limited to the above-described arrangements. For example, the scale 16 and detector 10 may be a magnetic scale and corresponding detector, and can be replaced with a known scale and detector.

When the encoder 100 is an incremental encoder, the marks of a transmission film or reflection film are formed on the scale 16 at equal intervals, and the received light intensity of light modulated by the marks represents a sine wave of a predetermined cycle. The scale 16 is straight when the encoder 100 is a linear encoder which measures a position, and concentric when the encoder 100 is a rotary encoder which measures an angle. The light source 12 and photoelectric conversion element 10 can be attached to a moving or rotating target object, and the scale 16 can be attached to the stationary side serving as the reference. To the contrary, the scale 16 may be attached to a target object, and the light source 12 and photoelectric conversion element 10 may be attached to the stationary side.

Referring back to FIG. 1, in the detector 10, a current-to-voltage converter is arranged subsequently to the photoelectric conversion element 10 and converts a received light intensity into a voltage signal. If necessary, a voltage amplifier may be arranged at the subsequent stage, and amplifies the voltage signal to a predetermined voltage level. An A/D converter 20 converts a detection signal from the detector 10, from an analog signal into a digital signal. A digital signal processor 200 processes the digital signal from the A/D converter 20 to generate data representing the position of the target object, correct the data, and output the corrected data. The digital signal processor 200 is constructed by a high-speed digital signal processor such as an FPGA (Field Programmable Gate Array) or DSP (Digital Signal Processor). The A/D converter 20 and digital signal processor 200 constitute a processor 150 which generates, based on a detection signal output from the detector 10, data representing the position of a target object, corrects the data, and outputs the corrected data.

Based on a digital signal from the A/D converter 20, a data generator (generator) 30 generates data representing the position of a target object. For example, in an absolute encoder, the data generator 30 reproduces pseudorandom number codes expressed by 0 and 1 in accordance with an intensity signal reflecting the pseudorandom number codes, as shown in FIG. 2. Then, the data generator 30 collates the reproduced pseudorandom number codes with the reference table (not shown) of the absolute position with respect to the pseudorandom number code, which is held in the data generator 30, thereby obtaining an absolute position corresponding to the detected pseudorandom number codes. By subdividing the phase of the pseudorandom number codes, the measurement resolution and accuracy of the encoder 100 can be improved.

A timing generator 70 receives a signal from an oscillator 80 and the data_req signal 210 from the measurement data collection apparatus 500 and generates a meas_start signal 110, meas signal 111, ad_start signal 116, and data_out_start signal 120. In response to the meas_start signal 110 from the timing generator 70 and a calc_end signal 112 from the data generator 30, a time measurement device (delay time measurement device) 60 measures the delay time for correcting the correction data 220.

The operation timings of the respective devices and signal processing in the encoder 100 will be explained with reference to FIGS. 3 and 4. FIG. 4 is a timing chart showing the operation timings of the respective devices. A data_req signal is the data_req signal 210 from the measurement data collection apparatus 500, and its predetermined cycle Treq is 10 μs, that is, the frequency is 100 kHz.

A clk signal is a clock signal generated by the timing generator 70. A clock signal generator 72 generates a higher-speed clk signal in accordance with a reference signal from the oscillator 80 in FIG. 3. The clock signal generator 72 is constructed by, for example, a PLL (Phase Locked Loop), and generates a 200-MHz clk signal from a 10-MHz reference signal from the oscillator 80. If necessary, the clock signal generator 72 generates clk signals of 100 MHz, 50 MHz, 25 MHz, and the like, and supplies them necessary for the respective calculations in the digital signal processor 200.

Figure 3:
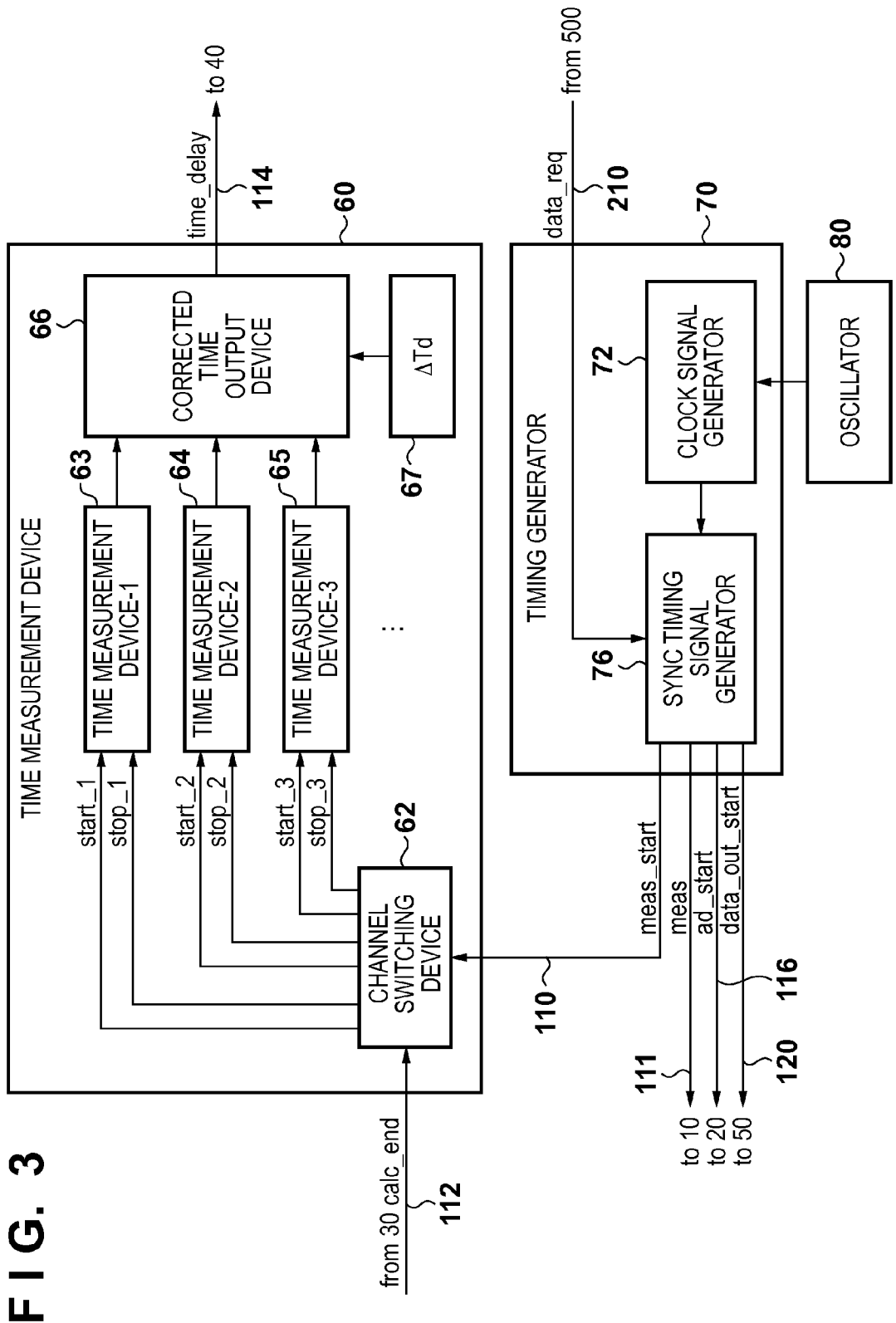
FIG. 3 is a block diagram showing the arrangements of a time measurement device and timing generator.
Figure 4:
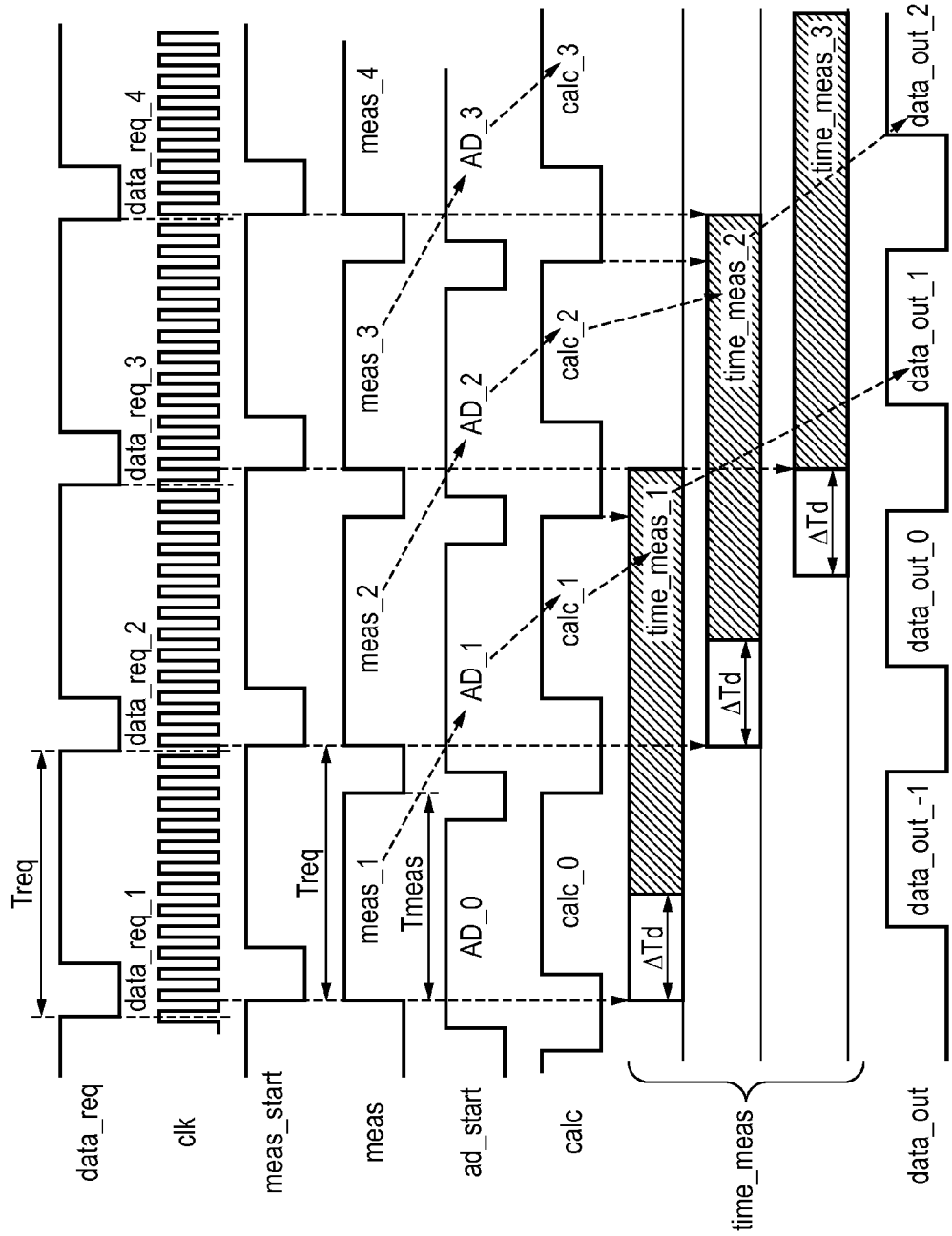
FIG. 4 is a timing chart showing operation timings.

In accordance with the clk signal from the clock signal generator 72 and the data_req signal 210, a sync timing signal generator 76 in FIG. 3 generates the meas_start signal 110 serving as a detection start signal for the detector 10. The measurement data collection apparatus 500 and encoder 100 perform asynchronous operations based on different clocks. Thus, the sync timing signal generator 76 synchronizes the data_req signal 210 from the measurement data collection apparatus 500 with the timing of the clk signal of the digital signal processor 200.

In FIG. 4, the cycle Treq of each of four data_req signals data_req_1 to data_req_4 is, for example, 10 μs and is constant. However, the data_req signal is asynchronous with the clk signal. An actual measurement cycle Tsp of the meas_start signal 110 synchronized with the clk signal may shift from the data_req signal by a maximum of one clock of the clk signal. For example, when the frequency of the clk signal is 200 MHz and the cycle is 5 ns, a maximum shift of 5 ns may be generated. However, a measurement position error arising from the moving velocity of a target object (to be described later) is very small, so the influence of step-out in the sync timing signal generator 76 is negligible.

The sync timing signal generator 76 generates the meas signal 111 in addition to the meas_start signal 110. The meas signal 111 is synchronized with the meas_start signal 110 and determines a light-receiving time Tmeas of the photoelectric conversion element of the detector 10. The light-receiving time changes depending on the sensitivity of the photoelectric conversion element, the light emission intensity of the light source 12, and the transmittance or reflectance of the scale 16. However, when the measurement cycle Treq of the data_req signal 210 from the measurement data collection apparatus 500 is, for example, 10 μs, the light-receiving time Tmeas needs to be shorter than 10 μs. That is, the light-receiving time Tmeas of the photoelectric conversion element of the detector 10 is set to satisfy Tmeas<Treq with respect to the measurement cycle Treq of the data_req signal 210 from the measurement data collection apparatus 500.

The detection delay time arising from detection by the detector 10 will be examined. The photoelectric conversion element of the detector 10 integrates transmitted light or reflected light traveling from the scale 16 during the light-receiving time Tmeas. Assume that the target object moves at a velocity V(m/s) during this integration time. Then, a measurement position shift is generated owing to the movement of the target object during the light-receiving time Tmeas taken to detect modulated light by the detector 10. For example, an average position shift, that is, a position error m arising from the detection delay time generated by the light-receiving time Tmeas is given by:

$$\text{position error } m \text{ arising from detection delay time} = \text{moving velocity } V \text{ (m/s)} \times \text{light-receiving time } T\text{meas}/2(s) \quad (1)$$

For example, when the measurement cycle Treq=10 μs, the light-receiving time Tmeas=8 μs, and the moving velocity V=1 m/s, the position error arising from the detection delay time becomes 4 μm according to equation (1). High-accuracy position measurement requires, for example, an accuracy of 1 μm or smaller, so this position error cannot be ignored.

The influence of the detection delay time may be obtained by actual measurement by evaluating a position output from the encoder 100, or by simulation. Here, for simplicity, the influence is given by:

$$\text{detection delay time } s = \text{light-receiving time } T\text{meas}/2(s) \quad (2)$$

That is, the detection delay time becomes half the time taken to detect modulated light by the detector 10 once.

The meas signal such as meas_1 in FIG. 4 is a signal generated in accordance with data_req_1 from the measurement data collection apparatus 500. The detector 10 detects modulated light based on the meas signal. The sync timing signal generator 76 also generates the ad_start signal 116. Referring to FIG. 4, an analog detection signal output from the detector 10 in accordance with the meas_1 signal is converted into a digital signal by the A/D converter 20 at the timing of subsequent AD_1. Measurement based on the next meas_2 signal is performed subsequently to measurement meas_1.

To perform accurate position measurement even when the data_req signal from the measurement data collection apparatus 500 has the short measurement cycle Treq, the detector 10 performs new measurement in parallel to the execution of A/D conversion and subsequent signal processing. In FIG. 4, the next measurement meas_2 is performed in parallel to AD_1 and calculation calc_1 by the data generator 30 based on a signal from AD_1. The next measurement meas_3 is performed in parallel to AD_2 and calc_2, and the next measurement meas_4 is performed in parallel to AD_3 and calc_3. For example, if A/D conversion by AD_1 and subsequent signal processing are performed after measurement based on the meas_1 signal, and the next measurement is performed in accordance with the meas_2 signal after the end of them, the measurement cycle Tsp needs to be very long. When the data_req signal from the measurement data collection apparatus 500 has the short measurement cycle Treq, the encoder 100 cannot function appropriately.

The operation of the time measurement device 60 in FIG. 3 will be explained with reference to the timings in FIG. 4. In the time measurement device 60, a channel switching device 62 receives the meas_start signal 110 from the timing generator 70. For example, delay time measurement by a first time measurement device 63 starts in synchronism with the measurement start timing of meas_1 synchronized with the clk signal using data_req_1 as a trigger. Also, delay time measurement by a second time measurement device 64 starts in synchronism with the measurement start timing of meas_2 based on the next data_req_2. Further, delay time measurement by a third time measurement device 65 starts in synchronism with the measurement start timing of meas_3 based on the next data_req_3. The delay time may be measured using a dedicated timer or counter. It is also possible to operate one timer or counter, read and hold its value at the measurement start timing, and measure the delay time in accordance with the difference from a value at the end of measurement. In this manner, the time measurement device 60 starts delay time measurement every time measurement starts in accordance with the measurement cycle, and in parallel executes a plurality of delay time measurement operations.

Referring to FIG. 4, delay time measurement time_meas_1 starts in synchronism with the measurement start timing of meas_1. Similarly, delay time measurement time_meas_2 starts in synchronism with the measurement start timing of meas_2. Delay time measurement time_meas_3 starts in synchronism with the measurement start timing of meas_3.

Analog data by meas_1 is converted into a digital signal through AD_1, and the data generator 30 performs position calculation through calc_1. After the end of position calculation, the calc_end signal 112 is output from the data generator 30 and input to the channel switching device 62 of the time measurement device 60. This signal notifies the channel switching device 62 that the position calculation meas_1 has ended. Then, the channel switching device 62 causes the first time measurement device 63 to be in a state where the delay time measurement may be stopped, and to stop the delay time measurement in synchronism with the subsequently input measurement start timing. In the example of FIG. 4, the delay time measurement time_meas_1 by the first time measurement device 63 is stopped in synchronism with the measurement start timing of meas_3. Similarly, as for time_meas_2 and time_meas_3, the delay time measurement is stopped in synchronism with the calc_end signal 112 from the data generator 30 and the subsequently input measurement start timing. In this case, Ttm_1 is the delay time measurement value by time_meas_1.

Output of position data for data_req_3 in FIG. 4 uses position data of time_meas_1 for which position calculation has ended immediately before the data_req signal. At the timing of data_req_3, the delay time measurement time_meas_2 is ongoing because position calculation has not ended yet. The delay time measurement time_meas_3 starts in accordance with the immediately succeeding meas_3 signal. A corrected data output device 50 outputs corrected data upon receiving the first data_req signal received after data generation. However, the corrected data output timing may not be the timing when the first data_req signal is received after data generation.

Output of position data for the data_req signal 210 from the measurement data collection apparatus 500 needs to guarantee position data at the timing of the data_req signal. The present invention enables accurate position measurement even when performing high-speed measurement in which the measurement cycle is shorter than the sum of the times taken for processes by the detector 10, the data generator 30, a correction device 40, and the corrected data output device 50. For this purpose, position data for the data_req signal 210 uses data which has been measured in synchronism with the previous data_req signal 210. The time till the data_req signal 210 which outputs position data after the start of measurement by the time measurement device 60 is measured as the delay time. The measured delay time is input to a corrected time output device 66. The corrected time output device 66 corrects the measured delay time by the detection delay time in the detector 10 in accordance with ΔTd of circuit sign 67.

Referring to FIG. 4, position data output at the timing of data_req_3 is data measured by meas_1, and the delay time is Ttm1 mentioned above. That is, position data to be output is data which has been measured the time Ttm1 before. However, as described above, data actually measured for Ttm1 is delayed owing to the detection delay time in the detector 10. Considering the detection delay time, the corrected delay time is given by:

$$\text{corrected delay time} = \text{measured delay time} - \text{detection delay time by detector} \qquad (3)$$

In this way, the delay time actually used for correction is the difference between the measured delay time and the detection delay time. The corrected delay time obtained by subtracting the detection delay time is input as a time_delay signal 114 to the correction device 40. In the example of FIG. 4, Ttm1=20 μs, and the detection delay time is ΔTd/2=4 μs according to equation (2). Hence, the delay time corrected according to equation (3) becomes 16 μs.

The correction device 40 in FIG. 2 corrects position data based on position data from the data generator 30 and the corrected delay time, that is, time_delay signal 114 from the time measurement device 60. Similar to equation (1), a position error is generated in accordance with the moving velocity of a target object. Therefore, the correction device 40 corrects position data by the product of the moving velocity and corrected delay time:

$$\text{position data correction amount } m = \text{moving velocity } V \text{ (m/s)} \times \text{corrected delay time } s \qquad (4)$$

The moving velocity is calculated from the change amount of position data per unit time by using:

$$\text{moving velocity } V \text{ (m/s)} = \{\text{previous sample position data } m - \text{current sample position data } m\}/\text{measurement cycle } s \qquad (5)$$

For example, when the corrected delay time is 16 μs and the moving velocity is 1 m/s, position data is corrected by 16 μm according to equation (4). Note that a position error arising from the aforementioned step-out of about 5 ns in the sync timing signal generator 76 is 5 nm when the moving velocity is 1 m/s, and is very small with respect to the necessary position accuracy of the order of μm.

The correction device 40 corrects position data, and the corrected data output device (output device) 50 outputs the data_out signal 220 as the position data in accordance with the data_out_start signal 120 from the timing generator 70. Referring to FIG. 4, position data for data_req_3 undergoes position calculation and position data correction based on meas_1 data, and is transmitted as data_out_1 to the measurement data collection apparatus 500. Similarly, position data for data_req_4 undergoes position calculation and position data correction based on meas_2 data, and is transmitted as data_out_2 to the measurement data collection apparatus 500.

As described above, the first embodiment can cope with even high-speed measurement in which the measurement cycle is shorter than the sum of the times taken for processes by the detector 10, data generator 30, correction device 40, and corrected data output device 50. More specifically, the detector 10 performs a new measurement in parallel to execution of the data generator 30. The time measurement device 60 starts delay time measurement every time measurement starts, in parallel executes a plurality of delay time measurement operations, and ends the delay time measurement in accordance with the data_req signal input after the end of calculation by the data generator 30. Further, the time measurement device 60 corrects the delay time by subtracting the detection delay time from the measured delay time. The correction device 40 calculates a signal correlated with the velocity based on the temporal change amount of position data, and corrects the position data by the product of the calculated signal and corrected delay time. Accordingly, even when performing high-speed position or angle measurement in accordance with the measurement data_req signal from the host system 500, the delay time in measurement can be measured to correct position data, achieving high-speed, high-accuracy position or angle measurement.

Figure 5:
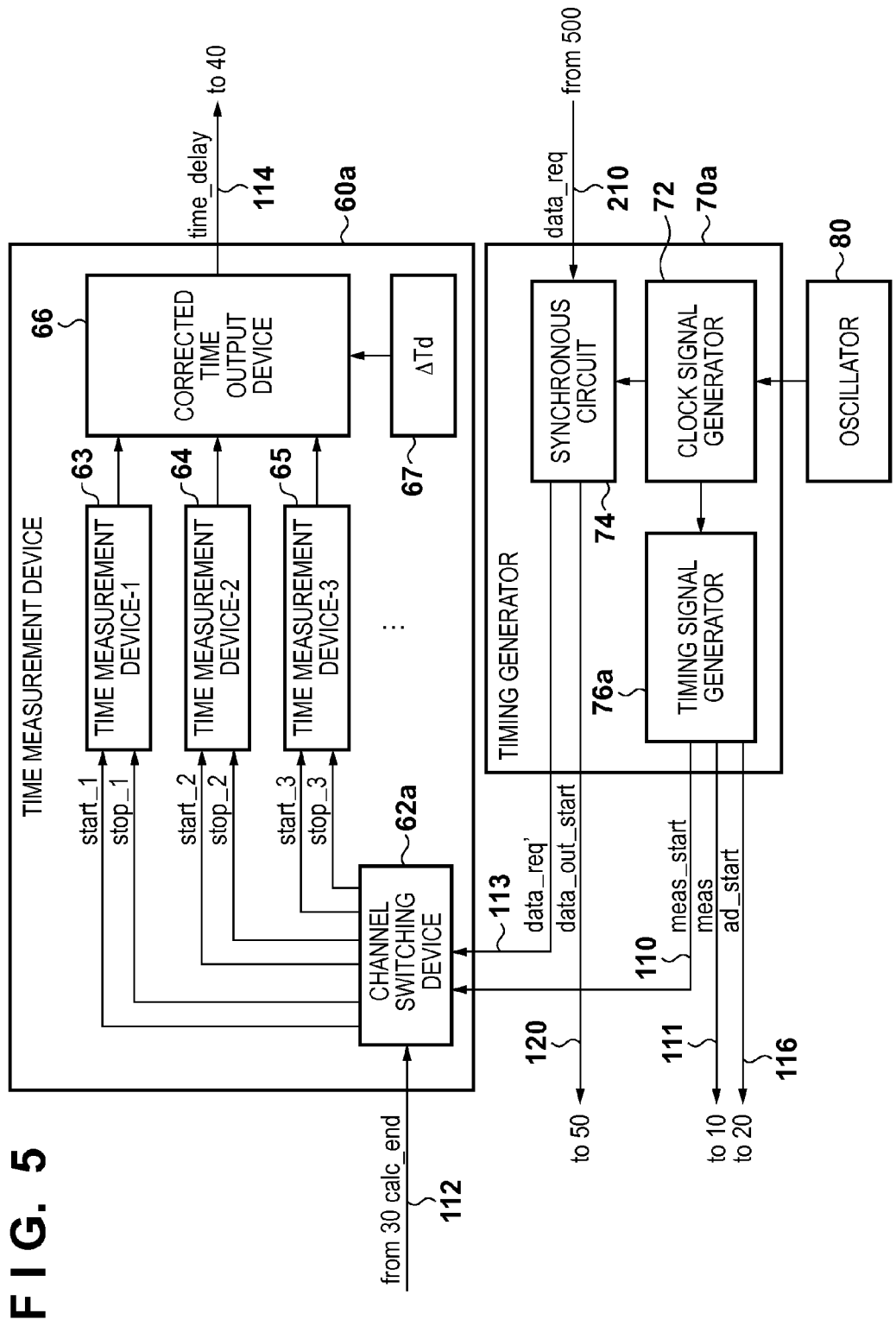
FIG. 5 is a block diagram showing the arrangements of a further time measurement device and timing generator.
Figure 6:
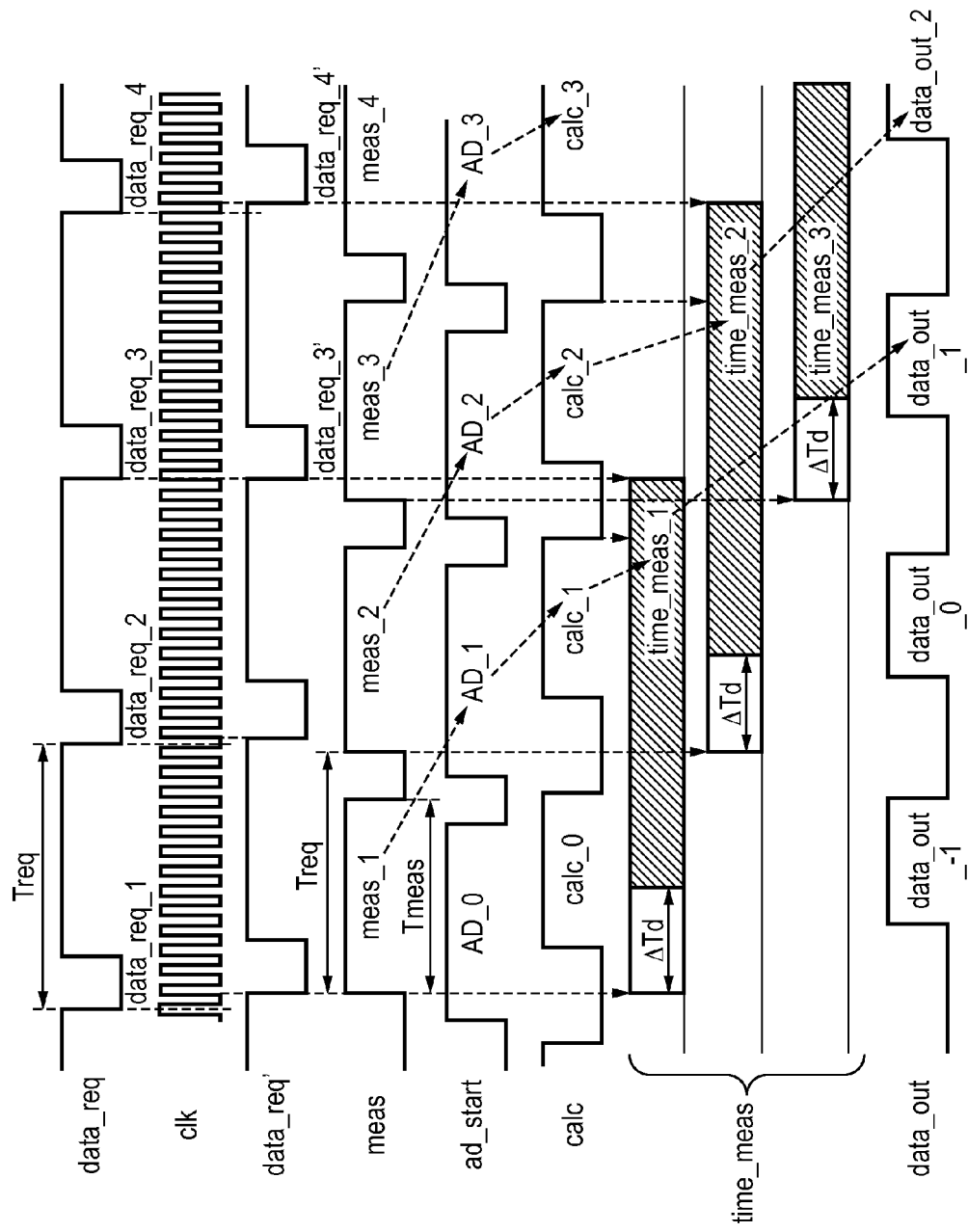
FIG. 6 is a timing chart showing operation timings of FIG. 5.

Next, a variation of the above will be described. This arrangement differs from the above described arrangement by the configuration of the time measurement device 60*a* and timing generator 70*a*. The same circuit reference numerals denote the same parts which perform the same operations as those described above, and a description thereof will not be repeated. FIG. 5 is a block diagram showing a variation in the arrangements of the time measurement device 60*a* and timing generator 70*a*. FIG. 6 is a timing chart showing the operation timings of the respective devices of an encoder 100.

In accordance with a clk signal from a clock signal generator 72, a timing signal generator 76*a* generates a meas_start signal 110, a meas signal 111 which determines a light-receiving time Tmeas of a detector 10, and an ad_start signal 116 for performing A/D conversion. In the configuration according to FIG. 3, the meas_start signal 110 is generated in synchronism with the clk signal generated by the clock signal generator 72 in order to synchronize the data_req signal 210 with the timing of the clock signal of the digital signal processor 200. In the configuration according to FIG. 5, however, various signals described above are generated in accordance with the clk signal generated by the clock signal generator 72 independently of a data_req signal 210 from a measurement data collection apparatus 500. A synchronous circuit 74 synchronizes the data_req signal 210 from the measurement data collection apparatus 500 with the clk signal generated by the clock signal generator 72 to generate a data_req' signal 113 and output it to a channel switching device 62*a* of the time measurement device 60*a*.

Referring to FIG. 6, data_req_3 from the measurement data collection apparatus 500 is synchronized with the clk signal to generate a data_req_3' signal. For example, the measurement cycle of each of data_req_1 to data_req_4 is Treq=10 μs. The data_req' signal 113 after synchronization with the clk signal may shift from the data_req signal by a maximum of one clock of the clk signal. For example, when the frequency of the clk signal is 200 MHz and the cycle is 5 ns, a maximum shift of 5 ns may be generated. However, the 5 ns time shift is very small and its influence is negligible, as described above.

A measurement cycle Tsp of the meas signal 111 generated independently of the data_req signal 210 from the measurement data collection apparatus 500 is asynchronous to the measurement cycle Treq and does not coincide with it. The configuration of FIG. 5 enables accurate position measurement even when performing high-speed measurement in which the measurement cycle is shorter than the sum of the times taken for processes by the detector 10, a data generator 30, a correction device 40, and a corrected data output device 50. For this purpose, the cycle Tsp of measurement to be actually performed that is generated independently of the measurement cycle Treq of the data_req signal from the measurement data collection apparatus 500 needs to satisfy Tsp≤Treq. The remaining operations, that is, the operations of the detector 10, A/D converter 20, data generator 30, correction device 40, and corrected data output device 50 are the same as those in the description of FIG. 3 and FIG. 4.

The channel switching device 62*a* of the time measurement device 60*a* starts time measurement operations in a first time measurement device 63, second time measurement device 64, and third time measurement device 65 in accordance with meas_1, meas_2, and meas_3 signals. For example, referring to FIG. 6, a position calculation end signal calc_1 is input to the channel switching device 62*a*. Then, the channel switching device 62*a* changes delay time measurement time_meas_1 by the first time measurement device 63 to be a stoppable state, and stops the delay time measurement in accordance with the subsequently input data_req_3'. Similarly, as for time_meas_2, the channel switching device 62*a* changes the delay time measurement time_meas_2 by the second time measurement device 64 in accordance with calc_2 to be a stoppable state, and stops the delay time measurement in accordance with the subsequently input data_req_4'.

As described previously, after the detection delay time in the detector 10 is subtracted from the measured delay time, the correction device 40 corrects position data. The corrected data output device 50 outputs the corrected position data as position data of a data_out signal 220 in accordance with a data_out_start signal 120 from the timing generator 70*a*. Note that the synchronous circuit 74 generates the data_out_start signal 120 based on the data_req signal 210 and the clk signal from the clock signal generator 72, as shown in FIG. 5.

Referring to FIG. 6, position data for data_req_3 undergoes position calculation and position data correction based on meas_1 data, and is transmitted as data_out_1 to the measurement data collection apparatus 500. Similarly, position data for data_req_4 undergoes position calculation and position data correction based on meas_2 data, and is transmitted as data_out_2 to the measurement data collection apparatus 500.

The configuration of FIG. 5 can also cope with even high-speed measurement in which the measurement cycle is shorter than the sum of the times taken for processes by the detector 10, data generator 30, correction device 40, and corrected data output device 50. More specifically, the detector 10 performs new measurement in parallel to execution of the data generator 30. The time measurement device 60a starts delay time measurement every time measurement starts, in parallel executes a plurality of delay time measurement operations, and ends the delay time measurement in accordance with a measurement data acquisition signal input after the end of calculation by the data generator 30, thereby determining the delay time. Further, the time measurement device 60a corrects the delay time by subtracting the detection delay time from the measured delay time. The correction device 40 calculates a signal correlated with the velocity based on the temporal change amount of position data, and corrects the position data by the product of the calculated signal and corrected delay time. Therefore, even when performing high-speed position or angle measurement in accordance with the measurement data_req signal from the host system 500, the delay time in measurement can be measured to correct position data, achieving high-speed, high-accuracy position or angle measurement.

According to the present invention, even when performing high-speed position or angle measurement in accordance with the measurement data_req signal from the host system 500, the delay time in measurement can be measured to correct position data, achieving high-speed, high-accuracy position or angle measurement.

While the present invention has been described with reference to illustrative examples, it is to be understood that the invention is not limited to the disclosed illustrative examples. The scope of the following claims is to be accorded the broadest interpretation so as to encompass all such modifications and equivalent structures and functions.

This application claims the benefit of Japanese Patent Application No. 2013-078091 filed Apr. 3, 2013, which is hereby incorporated by reference herein in its entirety.

What is claimed is:

1. An encoder for outputting a measurement value of a position or angle of a scale in accordance with inputting of a command signal, the encoder comprising:
   a detector configured to detect the scale and output a detection signal; and
   a processor configured to execute:
      a generation task that generates data representing a position or angle of the scale from the output detection signal;
      a correction task that calculates corrected data representing the position or angle of the scale from the output detection signal corresponding to a previous input command signal, at a time of inputting a current command signal, based on a velocity obtained from a change amount of the generated data and a delay time, which is a time from the detector detecting the scale in accordance with the previous command signal until receiving the current command signal; and
      an outputting task that outputs the corrected data,
   wherein the processor is configured to execute processings including the generation task and the correction task in parallel, for the data representing the position or angle of the scale for the output detection signal corresponding to the previous command signal at the time of inputting the current command signal.

2. The encoder according to claim 1, wherein the command signal is input at a cycle that is longer than a time taken for the detection of the scale and shorter than a total time taken for the detection of the scale and the generation and correction tasks to generate the data and the correction data corresponding to the detection of the scale.

3. The encoder according to claim 1, wherein the velocity is an angular velocity of the scale.

4. The encoder according to claim 1, wherein the detector is configured to start the detection in synchronization with inputting of the command signal.

5. The encoder according to claim 1, wherein the detector is configured to start the detection independently of inputting of the command signal.

6. The encoder according to claim 1, wherein:
   the detector includes a photoelectric conversion element, and
   the processor includes an A/D converter configured to perform A/D-conversion of the output detection signal.

7. The encoder according to claim 1, wherein the processor includes a timer or counter, configured to measure, using the timer or counter, the delay time.

8. The encoder according to claim 7, wherein:
   the timer or counter is configured to start a time measurement in response to the current command signal, and to end the time measurement in response to the next command signal, and
   the delay time is obtained by correcting the time measured by the timer or counter based on a detection delay of the detector.

9. The encoder according to claim 1, wherein the generation task includes A/D conversion of the output detection signal to provide the generated data.

10. The encoder according to claim 9, wherein the detection of the scale in accordance with the current command signal and at least the A/D conversion are performed in parallel.

11. The encoder according to claim 1, wherein the outputting task outputs the corrected data representing the position or angle of the scale from the detection signal output in accordance with the previous input command signal, at a time of inputting a next command signal.

12. A method of outputting a measurement value of a position or angle of a scale in accordance with inputting of a command signal, the method comprising steps of:
   detecting the scale and outputting a detection signal;
   generating data representing a position or angle of the scale from the output detection signal;
   calculating corrected data representing the position or angle of the scale from the output detection signal corresponding to a previous input command signal, at a time of inputting a current command signal, based on a velocity obtained from a change amount of the generated data and a delay time, which is a time from the detector detecting the scale in accordance with the previous command signal until inputting of the current command signal;
   outputting the corrected data; and
   performing processings including the generating step and the calculating step in parallel for the data representing the position or angle of the scale for the detection signal detected for the previous command signal in parallel at the time of inputting the current command signal.

13. The method according to claim 12, further comprising the step of measuring, using a timer or counter, the delay time.

14. The encoder according to claim 1, wherein the delay time is a time difference between a timing of inputting the previous command signal and a timing of the detection performed in accordance with the previous command signal.

15. The encoder according to claim 14, wherein the timing during the detection performed in accordance with the previous command signal is a midpoint of a period during which the detection is performed in accordance with the previous command signal.

\* \* \* \* \*